(12) United States Patent
Lee et al.

(10) Patent No.: US 11,206,393 B2
(45) Date of Patent: Dec. 21, 2021

(54) DISPLAY LATENCY MEASUREMENT SYSTEM USING AVAILABLE HARDWARE

(71) Applicant: Microsoft Technology Licensing, LLC, Redmond, WA (US)

(72) Inventors: Matthew W. Lee, Sammamish, WA (US); James Andrew Goossen, Sammamish, WA (US); Roberto Ruggeri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/713,444

(22) Filed: Sep. 22, 2017

(65) Prior Publication Data
US 2019/0098293 A1 Mar. 28, 2019

(51) Int. Cl.
*H04N 17/04* (2006.01)
*G06T 7/00* (2017.01)
*G09G 3/00* (2006.01)

(52) U.S. Cl.
CPC .......... *H04N 17/04* (2013.01); *G06T 7/0002* (2013.01); *G09G 3/006* (2013.01); *G06T 2207/10016* (2013.01); *G09G 2310/08* (2013.01); *G09G 2354/00* (2013.01); *G09G 2360/145* (2013.01)

(58) Field of Classification Search
USPC .......................................... 715/764; 348/184
See application file for complete search history.

(56) References Cited

U.S. PATENT DOCUMENTS

| 7,657,647 B2 | 2/2010 | Onomatsu |
| 8,317,580 B2 | 11/2012 | Kikuchi |
| 8,730,251 B2 | 5/2014 | Mathew et al. |

(Continued)

FOREIGN PATENT DOCUMENTS

| CN | 102169664 B | 8/2013 |
| WO | 2016063023 A1 | 4/2016 |

OTHER PUBLICATIONS

Boyaci, et al., "vDelay: A Tool to Measure Capture-to-Display Latency andFrame Rate", In Proceedings of 11th IEEE International Symposium on Multimedia, Dec. 14, 2009, pp. 194-200.

(Continued)

*Primary Examiner* — Brian P Yenke
*Assistant Examiner* — Omer Khalid
(74) *Attorney, Agent, or Firm* — Rainier Patents, P.S.

(57) ABSTRACT

Methods, systems, and apparatuses are provided for measuring a display latency. A video capturing device is configured to capture a video of a reference light flash of a light emitter of a computing device. In the same video, the video capturing device is configured to capture a flash of a predetermined image displayed in a reference frame on a display screen coupled to the computing device. The video is analyzed to determine a time difference between the reference light flash of the light emitter and the flash of the predetermined image on the display screen. The determined time difference is compared with a reference time difference to determine a display latency, and the display latency may be provided to a user. In this manner, a display latency may be determined accurately and with readily available hardware, thus reducing the need to rely on expensive and specialized measuring equipment.

21 Claims, 8 Drawing Sheets

(56) References Cited

U.S. PATENT DOCUMENTS

| | | | | |
|---|---|---|---|---|
| 8,917,322 | B2* | 12/2014 | Olson | G06T 3/0093 |
| | | | | 348/143 |
| 9,188,644 | B1 | 11/2015 | Blanton et al. | |
| 9,203,685 | B1 | 12/2015 | Perry et al. | |
| 2006/0258459 | A1 | 11/2006 | Davis et al. | |
| 2012/0287289 | A1* | 11/2012 | Steinberg | H04N 17/004 |
| | | | | 348/181 |
| 2013/0007386 | A1* | 1/2013 | Wolf | G06F 13/161 |
| | | | | 711/158 |
| 2013/0090163 | A1* | 4/2013 | Edson | A63F 13/335 |
| | | | | 463/31 |
| 2013/0310163 | A1* | 11/2013 | Smith | G07F 17/3241 |
| | | | | 463/26 |
| 2014/0085459 | A1* | 3/2014 | Blanton | H04N 17/04 |
| | | | | 348/135 |
| 2014/0101341 | A1 | 4/2014 | Colenbrander | |
| 2015/0348509 | A1 | 12/2015 | Verbeure et al. | |
| 2016/0026853 | A1* | 1/2016 | Wexler | G06K 9/00288 |
| | | | | 382/103 |
| 2016/0180811 | A1* | 6/2016 | Colenbrander | G06T 7/90 |
| | | | | 345/207 |
| 2017/0188023 | A1* | 6/2017 | Brabenac | H04N 17/02 |
| 2018/0212684 | A1* | 7/2018 | Aoyama | G06F 1/1626 |
| 2018/0293942 | A1* | 10/2018 | Gu | G09G 5/005 |

OTHER PUBLICATIONS

"White Paper: Understanding- and Reducing—Latency in Video Compression Systems", In White Paper of Cast, Oct. 2, 2013, 4 pages.

"Display Lag: Input Lag Database for the Best Gaming Monitors & HDTVs Display Lag", Retrieved From https://web.archive.org/web/20130224022754/http://www.displaylag.com:80/display-database/, Feb. 24, 2013, 7 Pages.

"International Search Report and Written Opinion Issued in PCT Application No. PCT/US2018/039210", dated Jan. 17, 2019, 21 Pages.

* cited by examiner

500

600

700

800

DISPLAY LATENCY MEASUREMENT SYSTEM USING AVAILABLE HARDWARE

BACKGROUND

In gaming systems, a gaming console is generally coupled to a display device, such a monitor or television. Ideally, the point in time when the gaming console generates a video frame is the same point in time when the video frame appears on the display device. However, in typical gaming systems, this is rarely the case. Rather, in most arrangements, the video frame generated on the gaming console appears on the display device in a delayed fashion. This phenomenon, known as display latency or display lag, is largely due to characteristics of the display device attached to the gaming console. For instance, display latency may be the result of a display device conducting additional processing of received video frames (e.g., scaling) prior to the actual display of the video frames on the display device. In addition, user-adjusted settings may further alter a display latency of a display device. Given that display devices widely vary in their internal configurations and processing functions, different display devices may have different latency characteristics.

Display latency is typically measured with expensive high speed video capturing equipment and other specialized measurement equipment. This type of equipment is costly, difficult to acquire, and may require significant expertise to operate correctly.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for measuring a display latency. A video is captured of a reference light flash of a light emitter of a computing device via a video capturing device. In the same video, a predetermined image displayed in a reference frame on a display screen coupled to the computing device is captured. The video is analyzed to determine a time difference between the captured reference light flash on the computing device and the display of the predetermined image on the display screen. The determined time difference is compared with a reference time difference to determine a display latency. The display latency is provided, for example, to a user by displaying the display latency on the video capturing device or the display screen coupled to the computing device.

Further features and advantages, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
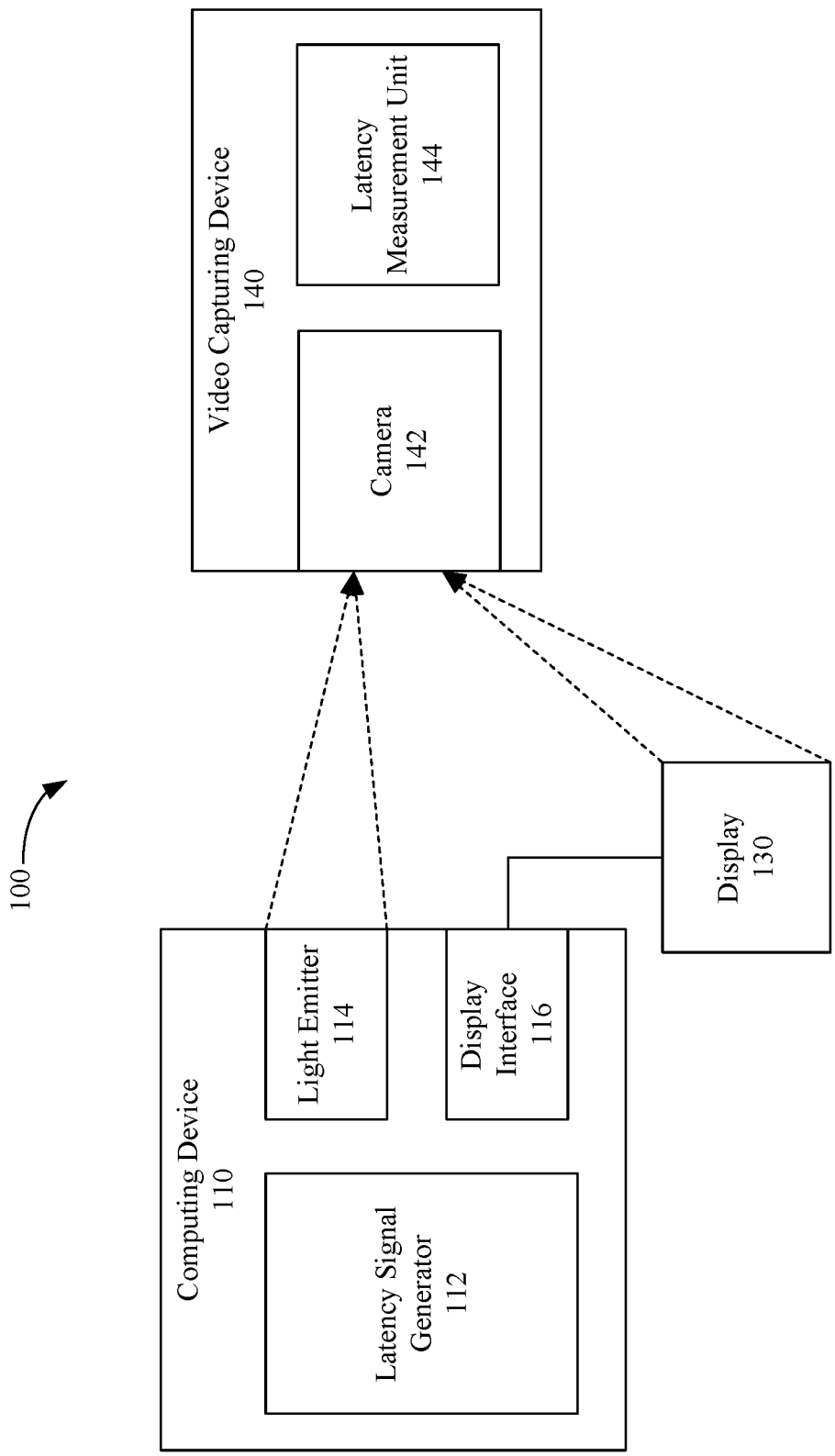
FIG. 1 shows a block diagram of a system for measuring a display latency, according to an example embodiment.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments.

In gaming systems, a gaming console is generally coupled to a display device, such a monitor or television, through one or more cables (and potentially through a receiver or other audio/video device). Ideally, the point in time when the gaming console generates a video frame is the same point in time when the video frame appears on the display device. However, in typical gaming systems, this is rarely the case. Rather, in most arrangements, the video frame generated on the gaming console appears on the display device in a delayed fashion. This phenomenon, known as display latency or display lag, is largely due to characteristics of the display device attached to the gaming console. For instance, display latency may be the result of a display device conducting additional processing of received video frames prior to the actual display of the video frames on the display device. In addition, user-adjusted settings may further alter a display latency of a display device. Given that display devices widely vary in their internal configurations and processing functions, different display devices may have different latency characteristics.

Depending on the specific hardware and arrangement, a display latency can range anywhere from a few milliseconds to hundreds of milliseconds. With many gaming consoles currently operating at 60 frames per second, a high display latency may result in the display device being delayed by several video frames compared to the gaming console's generation of those video frames, which may be noticeable to a player. In video games and other applications where fast action and quick response times are critical to achieving an enhanced and enjoyable user experience, the lowest attainable display latency is desired. Display latency, however, is typically measured with expensive high speed video capturing equipment and other specialized measurement equipment. This type of equipment is costly, difficult to acquire, and may require significant expertise to operate correctly.

Embodiments disclosed herein overcome these issues by measuring a display latency using commonly available hardware, such as an existing light emitter on a computing device, a display screen coupled to the computing device, and a video capturing device. By capturing a video of a reference light flash of a light emitter of a computing device, and capturing in the same video, a reference image displayed on the display screen, a timing difference of the captured reference light flash and displayed reference image may be determined. The determined timing difference may be compared to a reference time difference (e.g., based on a predetermined frequency of a reference light flash of the light emitter) to determine a display latency.

For example, embodiments described herein may cause an existing light emitter on a computing device, such as an on/off indicator on a computer or gaming console, to emit a reference light flash one or more times (e.g., at a predetermined frequency). The computing device may simultaneously transmit a reference frame containing a predetermined image to be displayed on the display screen coupled to the computing device (e.g., a monitor or television) at the one or more times. In one embodiment, the predetermined image may include a pattern or be arranged near a pattern. By capturing the reference light flash and a display of the predetermined image using commonly available hardware, such as a smartphone that includes a camera, the video containing the captured reference light flash and predetermined image may be analyzed to determine a display latency of the display screen. The display latency may be provided to a user, such as by displaying an indication of the latency on the display screen coupled to the computing device, or on the video capturing device. In an embodiment, a grade associated with the display latency may also be provided to a user. In another embodiment, a recommendation to reduce the display latency may also be provided.

This approach has numerous advantages, including enabling a display latency measurement with commonly available hardware, thereby reducing the need for a user to purchase and operate expensive high speed video capturing equipment and other specialized measurement equipment that may require significant expertise to operate correctly. Furthermore, because the reference light flash is synchronized to the transmission of the reference frame to the display screen, the display latency may be measured in an accurate manner.

Accordingly, embodiments provide the following (and additional) capabilities pertaining to measuring a display latency: (1) A mechanism to reduce the need to utilize expensive and specialized measurement equipment to measure a display latency; (2) a mechanism to enable a display latency measurement with relatively little user training; and (3) a mechanism to provide for an accurate display latency measurement using commonly available hardware.

Achieving a low display latency is important to video games feeling "good", especially for games that have fast action. Display latency is largely a function of the TV/monitor attached to a console/PC, and various TVs have different latency characteristics. Furthermore, settings on the TV/monitor may change the latency. Embodiments measure latency and may characterize the latency (e.g., as good, okay, bad, etc.). Accordingly, customers may be guided to configure the TV/monitor correctly, and/or may be influenced to purchase specific TVs/monitors with desired display latency characteristics.

As follows, example embodiments are described herein directed to techniques for measuring a display latency. For instance, FIG. 1 shows a diagram of an example latency measurement system 100 for measuring a display latency, according to an example embodiment. As shown in FIG. 1, latency measurement system 100 includes a computing device 110, a display 130 coupled to computing device 110, and a video capturing device 140. Computing device 110 may be a device configured to output a video signal to a display screen, such as a video game console (e.g., a Microsoft Xbox® of any version, a Sony Play Station® of any version, A Nintendo Wii®, NES, or Switch™ of any version, etc.), a desktop computer, a portable computer, or any other processing device for outputting video frames to a display device. In an embodiment, computing device 110 may be configured to execute video games, such as video games in which a low display latency may enhance a user's experience. For instance, computing device 110 may be configured to execute fast-action video games in which computing device 110 may receive a user input through, for example a gaming controller, process the user input, and display video frames resulting from the user input on a display device with a minimal delay. An example computing device that may incorporate the functionality of computing device 110 is discussed below in reference to FIG. 11.

As shown in FIG. 1, computing device 110 includes a latency signal generator 112, a light emitter 114, and a display interface 116. Light emitter 114 may be any light emitting device located on or near an external housing of computing device 110, such as a light emitting diode (LED), or any other device capable of emitting light. In an embodiment, light emitter 114 may be a power light, an on/off indicator light, a status light, or an activity light on or near the external housing of computing device 110. Display interface 116 may be any suitable video interface for outputting video frames to a display 130. In an embodiment, display interface 116 may be any one of a high-definition multimedia interface (HDMI), video graphics array (VGA) interface, universal serial bus (USB) interface, digital video interface (DVI), DisplayPort interface, component video interface, composite video interface, and coaxial video interface. Display interface 116 may also be or include any other type of wired or wireless video interface suitable for outputting video frames to display 130.

Display 130 comprises any type of display suitable for receiving and displaying video frames from display interface 116. For instance, display 130 may be a liquid crystal display, cathode ray tube display, light-emitting diode display, a plasma display, a display screen of a projector television, or any other type of display that may be coupled to computing device 110 through display interface 116. Display 130 may be external to, or incorporated in computing device 110.

Latency signal generator 112 is configured to generate signals such that light emitter 114 may emit a reference light flash. In an embodiment, latency signal generator 112 may generate signals such that the reference light flash occurs at one or more intervals, which may be random, or periodic, including a predetermined frequency. For instance, light emitter 114 may emit the reference light flash every second, or at a frequency of 1 hertz. Latency signal generator 112 is also configured to simultaneously transmit a reference frame comprising a predetermined image to display interface 116 at the same time, or substantially the same time, that latency signal generator 112 causes light emitter 114 to emit the reference light flash. In an embodiment, latency signal generator 112 transmits a reference frame to display interface 116 at the same frequency of the reference light flash. In this manner, light emitter 114 emits a reference light flash that is synchronized with the generation of a reference frame transmitted to display interface 116.

Video capturing device 140 includes a camera 142 and a latency measurement unit 144. In an embodiment, video capturing device 140 may be any type of mobile device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or be a mobile terminal, such as a smartphone. One example of a mobile device that may incorporate the functionality of computing device 140 is discussed below in reference to FIG. 12.

Camera 142 may include any type of image sensor, such as an image sensor array (e.g., charged coupled device (CCD), complementary metal oxide semiconductor (CMOS), etc.), capable of capturing video frames at a high frame rate. In an embodiment, camera 142 is configured to capture video frames at a frame rate of 60 frames per second or higher. In another embodiment, camera 142 is configured to capture video frames at a frame rate of 120 frames per second. In yet another embodiment, camera 142 is configured to capture video frames at a frame rate of at least 240 frames per second. As illustrated in FIG. 1, video capturing device 140 is positioned in a manner such that camera 142 may capture a video of light emitter 114 and a reference frame displayed on display 130. In an embodiment, video capturing device 140 may be positioned such that camera 142 may capture a video of light emitter 114 prior to capturing a video of display 130. In another embodiment, video capturing device 140 may be positioned such that camera 142 may capture a video of display 130 prior to capturing a video of light emitter 114. In yet another embodiment, video capturing device 140 may be positioned such that camera 142 simultaneously captures a video of light emitter 114 and display 130. In each case, both light emitter 114 and display 130 are captured in a same continuous video recording by the camera of video capturing device 140.

Latency measurement unit 144 is configured to analyze a video captured by camera 142 to determine a time difference between the reference light flash of light emitter 114 and the display of the reference frame containing the predetermined image on display 130 to determine a display latency. Latency measurement unit 144 may provide the display latency to a user through, for example a user interface on video capturing device 140 or any other suitable manner.

In another embodiment, video capturing device 140 may be implemented as a peripheral device that may be coupled to computing device 110 via a suitable wired or wireless interface. In such an embodiment, latency measurement unit 144 may be part of the peripheral device or may be integrated within computing device 110.

Figure 2:
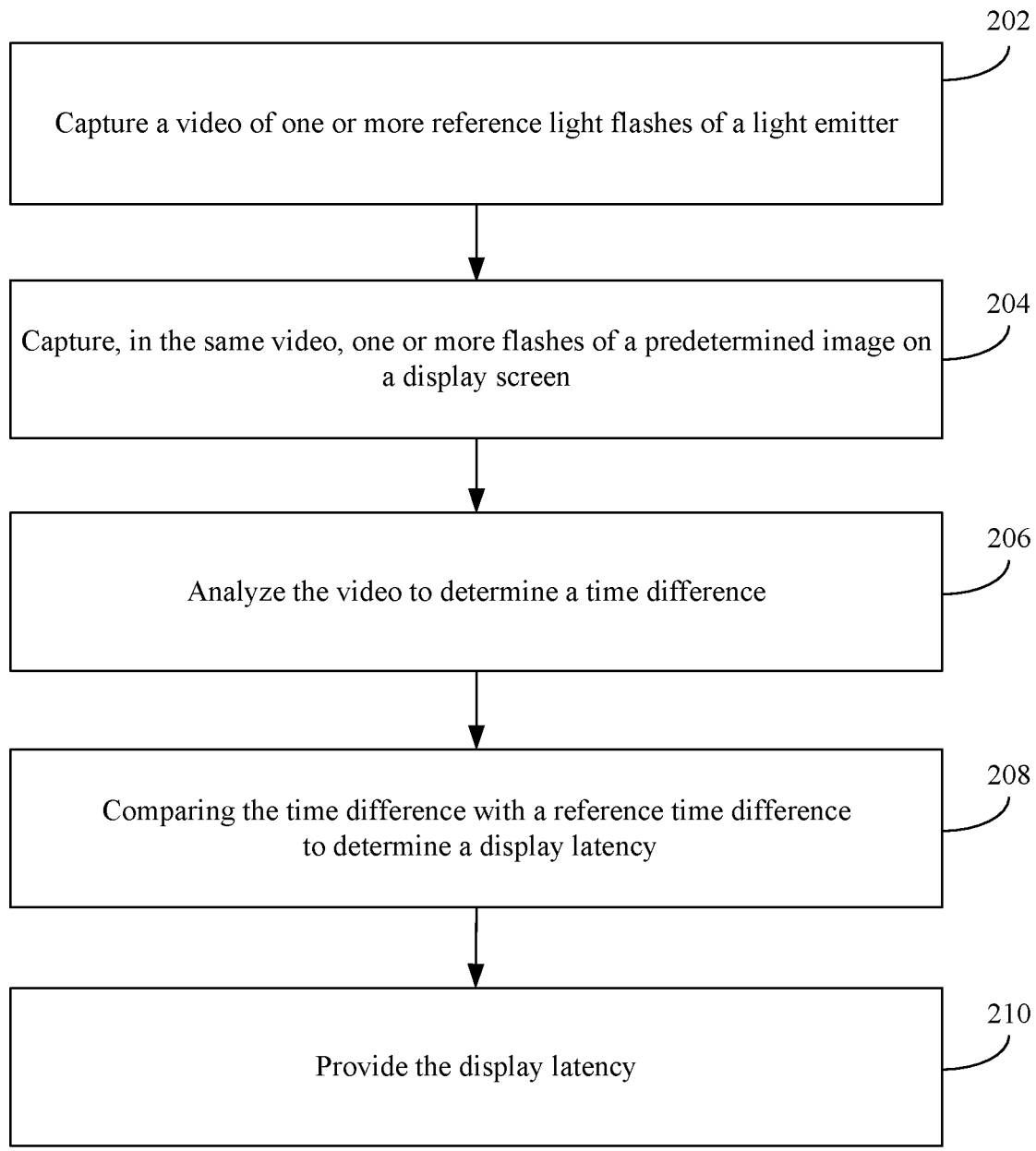
FIG. 2 shows a flowchart for measuring a display latency, according to an example embodiment.

Accordingly, in embodiments, the latency of display 130 may be measured by video capturing device 140. Latency measurement unit 144 may measure the display latency in various ways. For example, FIG. 2 shows a flowchart 200 for measuring a display latency, according to an example embodiment. In an embodiment, flowchart 200 may be implemented by video capturing device 140, camera 142, and/or latency measurement unit 144.

Figure 3:
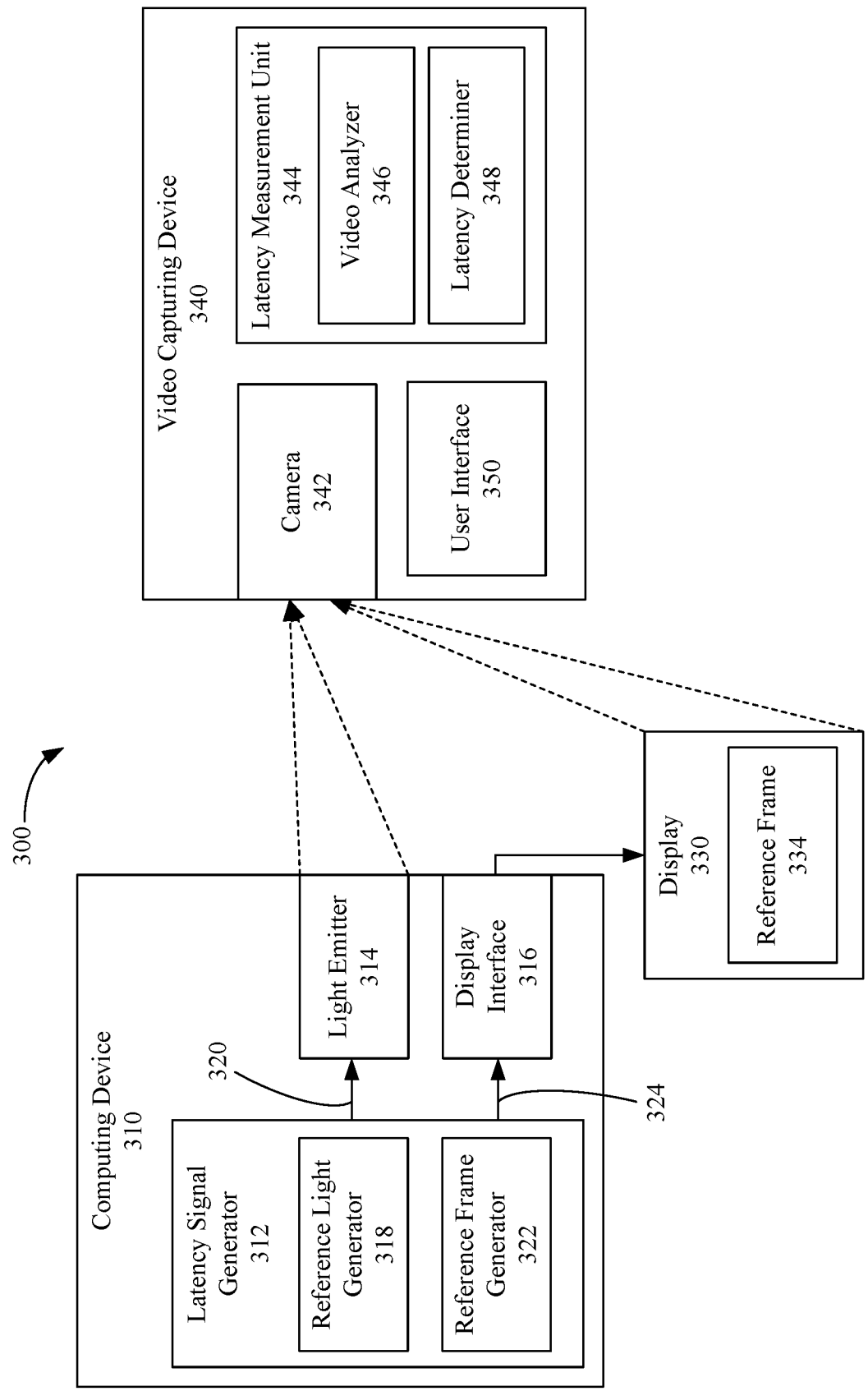
FIG. 3 shows a block diagram of a system for measuring a display latency, according to an example embodiment.

Latency measurement unit 144 may also operate in various other ways to measure a display latency. For instance, FIG. 3 shows a block diagram of a latency measurement system 300, according to an example embodiment. Latency measurement system 300 includes a computing device 310, a display 330, and a video capturing device 340. Computing device 310 includes a latency signal generator 312, a light emitter 314, and a display interface 316. In an embodiment, latency signal generator includes a reference light generator 318 and a reference frame generator 322. Reference light generator 318 may be configured to generate a reference light signal 320 causing light emitter 314 to emit one or more reference light flashes. Reference frame generator 322 may be configured to generate a reference frame signal 324 causing display interface 316 to transmit a reference frame 334 to display 330, such that a predetermined image in reference frame 334 is displayed on display 330.

Video capturing device 340 of FIG. 3 includes a camera 342, a latency measurement unit 344, and a user interface

350. Video capturing device 340 may be positioned such that camera 342 may capture a video of one or more reference light flashes from light emitter 314 and a predetermined image in reference frame 334 on display 330. In an embodiment, user interface 350 may be configured provide instructions guiding a user to capture a video of one or more reference light flashes from light emitter 314 and a predetermined image in reference frame 334 displayed by display 330. User interface 350 may also be configured to output a display latency measurement to a user. Latency measurement unit 344 of video capturing device 340 includes a video analyzer 346 and a latency determiner 348. Computing device 310, display 330, and video capturing device 340 of FIG. 3 are examples of computing device 110, display 130, and video capturing device 140, described above with reference to FIG. 1. In an embodiment, flowchart 200 of FIG. 2 may be implemented by video capturing device 340, camera 342, and/or latency measurement unit 344.

Accordingly, for purposes of illustration, flowchart 200 of FIG. 2 is described with continued reference to both FIGS. 1 and 3. For instance, latency measurement system 100 and latency measurement system 300 may operate according to flowchart 200. Latency measurement system 100, latency measurement system 300, and flowchart 200 are described as follows. Note that the steps of flowchart 200 may be performed in an order different than shown in FIG. 2 in some embodiments. Furthermore, not all steps of flowchart 200 need to be performed in all embodiments. Further structural and operational embodiments will be apparent to persons skilled in the relevant art(s) based on the following description regarding latency measurement system 100, latency measurement system 300, and flowchart 200.

Flowchart 200 begins with step 202. In step 202, a video of one or more reference light flashes of a light emitter is captured. For example, with reference to FIG. 3, reference light generator 318 of latency signal generator 312 is configured to generate reference light signal 320 that causes light emitter 314 to emit one or more reference light flashes. In a similar manner as described above with reference to FIG. 1, reference light signal 320 may cause light emitter 314 to emit reference light flashes at a predetermined frequency, e.g., at one reference light flash per second. In an embodiment, light emitter 314 emits the one or more reference light flashes with little to no delay from the time reference light generator 318 generates reference light signal 320. In other words, the emission of the one or more reference light flashes on light emitter 314 is simultaneous, or nearly simultaneous, with the generation of reference light signal 320. Video capturing device 340, through camera 342, may capture a video of the one or more reference light flashes of light emitter 314. In an embodiment, video capturing device 340, through camera 342, may be configured to capture a plurality of reference light flashes on light emitter 314. For instance, video capturing device 340 may be configured to capture a video comprising two or more consecutive reference light flashes.

In step 204, one or more flashes of a predetermined image on a display screen are captured in the same video. For instance, with reference to FIG. 3, reference frame generator 322 of latency signal generator 312 generates a reference frame signal 324 that is transmitted to display interface 316. Reference frame signal 324 may comprise a video frame that includes a predetermined image. In an embodiment, the predetermined image may comprise a pattern, or be arranged near a pattern. For instance, the pattern may comprise a Quick Response (QR) code, a shape, or any other suitable unique and/or identifiable visual marker that may be detected by video capturing device 340 using a suitable image processing algorithm. In another embodiment, the predetermined image may include a solid color image or shape that may be detected by video capturing device 340. In yet another embodiment, the predetermined image may include a combination of one or more patterns and a solid color image or shape. In another example embodiment, camera 342 may be configured to detect a pattern in a reference frame in order to ensure that camera 342 appropriately captures the predetermined image in the reference frame.

Reference frame signal 324 may also provide the predetermined image repetitively so the image appears repetitively on display 330 at the same frequency as the reference light flash of light emitter 314. In an embodiment, camera 342 may be configured to capture a plurality of appearances of the predetermined image on display 330. For instance, camera 342 may be configured to capture a video comprising two or more consecutive displays of the predetermined image on display 330.

Camera 342 may be positioned in a manner such that it may detect and capture the display of the reference frame 334 comprising a flash of the predetermined image on display 330, in the same video in which it captured a reference light flash of light emitter 314. As discussed previously, in an embodiment, camera 342 may identify the predetermined image in reference frame 334 by detecting a pattern displayed in reference frame 334. In another embodiment, camera 342 may be configured to capture a plurality of flashes of a predetermined image on display 334. As described above in more detail with reference to FIG. 1, camera 342 may capture one or more reference light flashes of light emitter 314 and the predetermined image on display 334 in any order. In another embodiment, camera 342 may positioned such that it may capture one or more reference light flashes of light emitter 314 and a flash of the predetermined image on display 334 simultaneously.

Reference frame generator 322 may be configured to generate reference frame signal 324 at the same time that reference light generator 318 generates reference light signal 320. In this manner, light emitter 314 may emit one or more reference light flashes at the same time, or substantially the same time, that reference frame generator 322 transmits reference frame 334 to display interface 316. However, due to video processing of the reference frame that takes place on display 330, the display of reference frame 334 on display 330 may be delayed compared to the emission of a reference light flash on light emitter 314 despite the signals being synchronized in computing device 310. Measurement of this delay, known as the display latency, is described in more detail as follows.

In step 206, the captured video is analyzed to determine a time difference between the emission of the one or more reference light flashes and the flash of the predetermined image. For example, with continued reference to FIG. 3, video analyzer 346 may be configured to analyze the video of camera 342 capturing the emission of one or more reference light flashes on light emitter 314 and the display of a flash of the predetermined image on display 330 to determine a time difference. Video analyzer 346 may perform any suitable image processing, image recognition, video processing, and/or other image analysis techniques to identify the light flash and predetermined image in video frames captured by camera 342. In an embodiment where a plurality of reference light flashes and/or a plurality of flashes of the predetermined image are captured, video analyzer 346 may determine an average time difference between the capture of the reference light flashes and flashes of the predetermined image.

Figure 4:
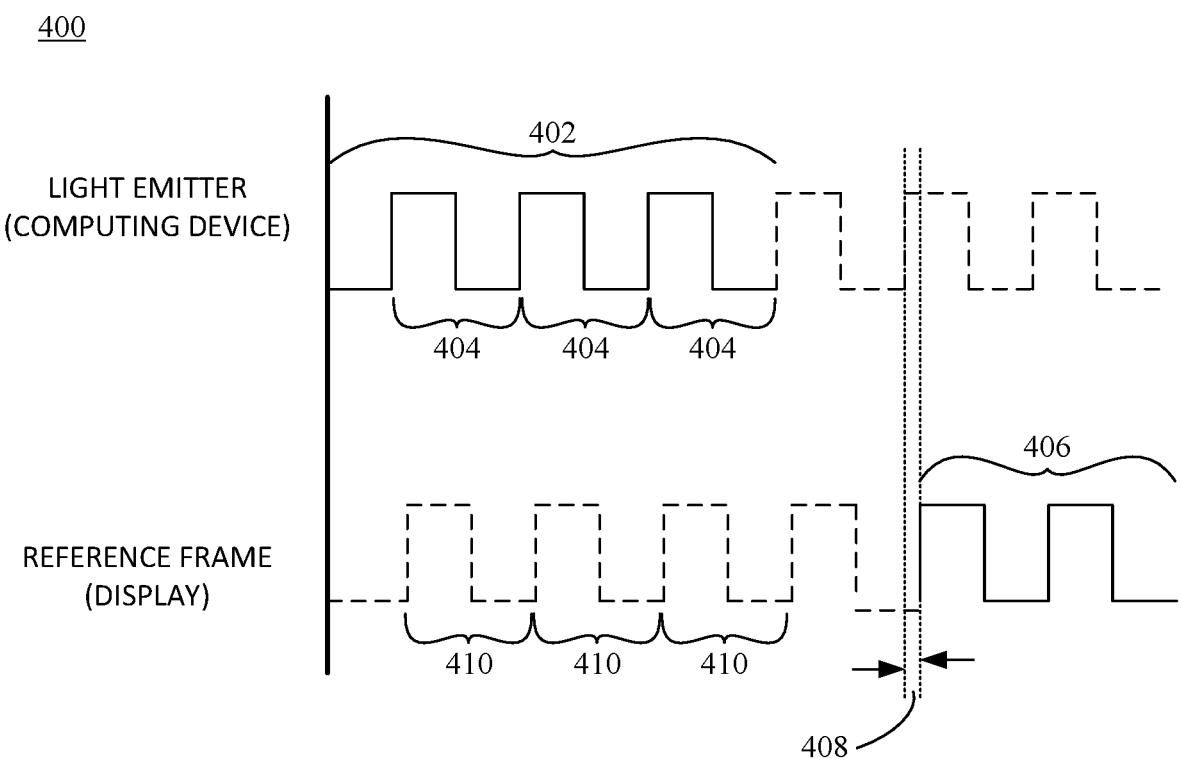
FIG. 4 shows a timing diagram of a light emitter of a computing device and a reference frame of a display, according to an example embodiment.

In step 208, the time difference is compared with a reference time difference to determine a display latency. For example, with respect to FIG. 3, latency determiner 348 may generate a reference time difference using the one or more reference light flashes of light emitter 314. In an embodiment, the reference time difference may represent the period of emissions of the one or more reference light flashes. For instance, FIG. 4 illustrates an exemplary timing diagram 400 of light emissions by light emitter 314 of a computing device 310 and displays of reference frame 324 comprising a predetermined image in display 330. As shown in FIG. 4, timing diagram 400 indicates a series of light flashes 402 and a series of reference frame displays 406. Each light flash in series of light flashes 402 is represented by a light flash period 404, where light is emitted during a high level and is not emitted during a low level of each light flash period 404. Furthermore, each predetermined image display in series of reference frame displays 406 in represented by a reference frame period 410, where the predetermined image is displayed in a reference frame during a high level and is not displayed during a low level of each reference frame period 410.

With reference to FIG. 4, camera 342 may detect the start of one or more reference light flashes of light emitter 314, indicated by the rising edges of light flash periods 404 (and which result from and substantially coincide with generation of reference light signal 320 by reference light generator 318 to include an instruction, a voltage level, etc., to cause light emitter 314 to emit a light flash). In the embodiment of FIG. 4, because reference light generator 318 causes light emitter 314 to emit reference light flashes at a predetermined frequency, latency determiner 348 may determine light flash period 404 (e.g., by detecting and measuring a time difference between sequential rising edges). In another embodiment, the reference time difference may be pre-known to video capturing device 340. For instance, if reference light generator 318 is known to cause light emitter 314 to emit one or more reference light flashes at a predetermined frequency, video capturing device 340 may store the period corresponding to the predetermined frequency as the reference time difference. By multiplying light flash period 404 with an integer value, latency determiner 348 may predict the arrival of future reference light flashes. In the illustrative example of FIG. 4, for example, light flash period 404 may be used to accurately predict an arrival of future reference light flashes on light emitter 314 as shown by the dotted lines.

Latency determiner 348 may be further configured to determine a display latency, illustrated in FIG. 4 as a display latency 408. Display latency 408 is a difference in time between emission of light by light emitter 314 and display of a reference frame by display 330, as determined by latency determiner 348 from video captured by camera 342.

For instance, camera 342 may capture, in the same video as the one or more reference light flashes, a display of one or more instances of the predetermined image in a reference frame 406 (which result from and substantially coincide with generation of reference frame signal 324 by reference frame generator 322 to include reference frame 406). The time difference between the emission of the one or more reference light flashes and the display of the predetermined image may be compared to determine display latency 408. In embodiments, the measured time of an emission of a reference light flash may be subtracted from the immediately next measured time of reference frame display, or may be subtracted from a later measured time of reference frame display after passing of one or more full reference frame periods 410 (by also subtracting out from the difference a sum of the reference frame periods 410 having passed). Based on the comparison, latency determiner 348 may determine a display latency 408 that represents the difference in time between a predicted emission of a reference light flash and a display of a predetermined image in a reference frame on display 330. Because the emission of the reference light flash is synchronized with the generation of the reference frame signal, the delay in display 330 displaying the reference frame received from computing device 310 may accurately reflect display latency 408 of display 330.

In an embodiment, video capturing device 340 may be configured to capture a plurality of reference light flashes of light emitter 314 and/or a plurality of displays of a predetermined image on display 330. In this illustrative embodiment, latency determiner 348 may determine a plurality of display latencies. In this embodiment, latency determiner 348 may be configured to average the plurality of display latencies to determine an average display latency.

In step 210, the display latency is provided to a user. For instance, with reference to FIG. 3, display latency 408 may be provided via user interface 350 of video capturing device 340. User interface 350 may provide the display latency in any suitable manner. For example, display latency 408 may be provided to a user as a time, for example in seconds or milliseconds (ms), corresponding to the measured display latency of display 330. In an embodiment, providing a display latency via user interface 350 may include, but is not limited to, displaying the display latency on a display of video capturing device 340 or providing the display latency via another output, such as an audio output of video capturing device 340. In another embodiment, video capturing device 340 may transit a measured display latency to computing device 310 to be displayed on display 330, or may transmit the measured display latency to any other network or device coupled to video capturing device 340.

Accordingly, in the above described manner, a user may easily and accurately measure the display latency of a display connected to a gaming console or other computing device in which a low latency is desired. In addition, by utilizing a video capturing device, such as a smartphone, that may be configured to guide a user through the process of measuring the display latency in the above manner, the user need not purchase expensive and specialized equipment to attain accurate latency measurements.

Figure 5:
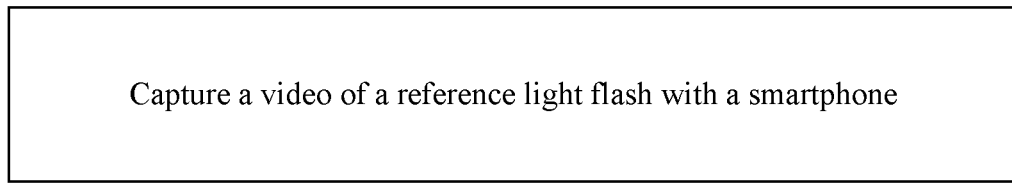
FIG. 5 shows a flowchart for capturing a video of a reference light flash with a smartphone, according to an example embodiment.

As described above, in an embodiment, video capturing device 140 and/or video capturing device 340 may operate in various ways to capture a video of one or more reference light flashes and a flash of a predetermined image in a reference frame. For instance, FIG. 5 shows a flowchart 500 for capturing a video of a reference light flash. In one embodiment, flowchart 500 may be implemented by video capturing device 140, camera 142, video capturing device 340, and/or camera 342, as shown in FIGS. 1 and 3. Other structural and operational embodiments will be apparent to persons skilled in the relevant art(s) based on the following discussion regarding flowchart 500.

Flowchart 500 begins with step 502. In step 502, a video of a reference light flash is captured with a smartphone. As an illustrative example with reference to FIG. 3, video capturing device 340 may comprise a mobile terminal with a camera, such as a smartphone. In an embodiment, the smartphone includes camera 342 that may be positioned in a manner to capture a reference light flash emitted by light emitter 314 of computing device 310. One example of a smartphone that may incorporate the functionality of video capturing device 140 and/or video capturing device 340 is discussed below in reference to FIG. 12.

Figure 6:
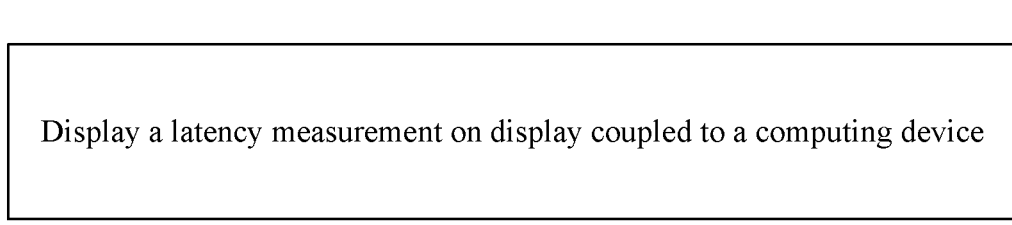
FIG. 6 shows a flowchart for displaying a latency measurement on a display of a computing device, according to an example embodiment.

As described above, in an embodiment, video capturing device 140 and/or video capturing device 340 may operate in various ways to provide a latency measurement. For instance, FIG. 6 shows a flowchart 600 for providing a display latency measurement on a display device, according to an example embodiment. In one embodiment, flowchart 600 may be implemented by display 130 and/or display 330, as shown in FIGS. 1 and 3. Other structural and operational embodiments will be apparent to persons skilled in the relevant art(s) based on the following discussion regarding flowchart 600.

Flowchart 600 begins with step 602. In step 602, a latency measurement is displayed on a display device coupled to a computing device. For instance, with reference to FIG. 3, video capturing device 340 may transmit a measured display latency to computing device 310. Upon receiving the measured display latency, computing device 310 may transmit one or more video frames containing the measured display latency to display interface 316 to be displayed on display 330. In another embodiment, video capturing device 340 may transmit a measured display latency over a network to any other computing device, such as a personal computer, a server, and/or another mobile device. For instance, in such an embodiment, a user may share a display latency measurement with other users, thereby permitting other users to view accurate display latencies of different computing device and display device configurations. An example of a computing device that may incorporate the functionality of computing device 110 and/or computing device 310 is discussed below in reference to FIG. 11.

Figure 7:
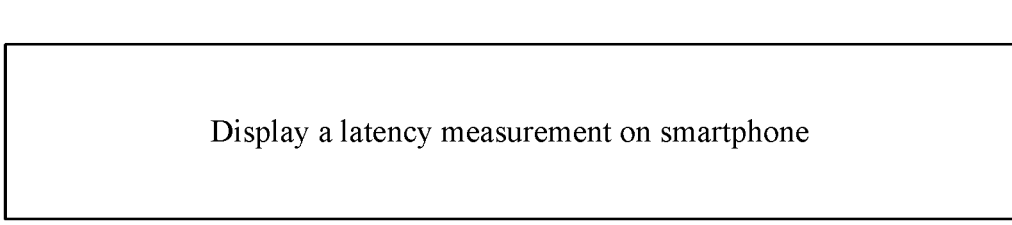
FIG. 7 shows a flowchart for displaying a latency measurement on a smartphone, according to an example embodiment.

As described above, in an embodiment, video capturing device 140 and/or video capturing device 340 may operate in various other ways to provide a latency measurement. For instance, FIG. 7 shows a flowchart 700 for providing a display latency measurement on a smartphone, according to an example embodiment. In one embodiment, flowchart 700 may be implemented by video capturing device 140, video capturing device 340, and/or user interface 350, as shown in FIGS. 1 and 3. Other structural and operational embodiments will be apparent to persons skilled in the relevant art(s) based on the following discussion regarding flowchart 700.

Flowchart 700 begins with step 702. In step 702, a latency measurement is displayed on a mobile terminal, such as a smartphone. As an illustrative example with reference to FIG. 3, and as discussed earlier with reference to FIG. 5, video capturing device 140 and/or video capturing device 340 may comprise a smartphone. For instance, the smartphone may include a display containing user interface 350, such as a liquid crystal display, light-emitting diode display, or any other type of display integral to video capturing device 340. In an embodiment, upon measuring a display latency in a manner as described above, video capturing device 140 and/or video capturing device 340 may display the measured display latency on the display of the smartphone via user interface 350. An example of a smartphone that may incorporate the functionality of video capturing device 140 and/or video capturing device 340 is discussed below in reference to FIG. 12.

Figure 8:
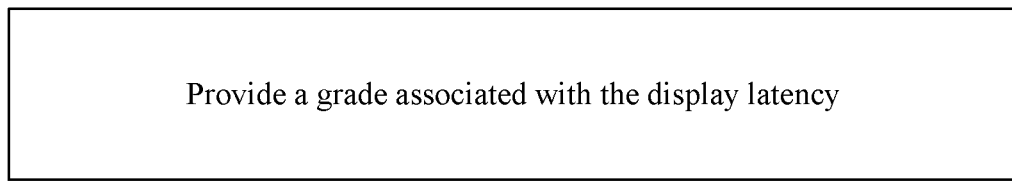
FIG. 8 shows a flowchart for providing a grade associated with the display latency, according to an example embodiment.

In embodiments, video capturing device 140 and/or video capturing device 340 may also operate to provide a grade for a measured display latency. For instance, FIG. 8 shows a flowchart 800 for providing a grade associated with a display latency. Flowchart 800 is described with respect to video capturing device 140 and/or video capturing device 340 for illustrative purposes. Other structural and operational embodiments will be apparent to persons skilled in the relevant art(s) based on the following discussion regarding flowchart 800.

Flowchart 800 begins with step 802. In step 802, a grade associated with a display latency measurement is provided. For instance, with reference to FIG. 3, upon latency determiner 348 determining a display latency in a manner as described above, user interface 350 may provide the display latency measurement to a user. For instance, user interface 350 may display a time, in seconds, milliseconds, or any other suitable unit of time, representing the display latency of display 330. In an embodiment, user interface 350 may provide the measured display latency as a grade. For instance, user interface 350 may display one of a plurality of grades, such as "excellent," "great," "good," "okay," and/or "bad," depending on the measured display latency of display 330. By way of an illustrative example, if latency determiner 348 determined that display 330 had a display latency of 16 ms, user interface 350 may provide the user with a grade of "excellent." As another illustrative example, if latency determiner 348 determined that display 330 had a display latency of 96 ms, user interface 350 may provide a grade of "bad" to a user. Note the grades discussed herein are illustrative examples only. Other grading systems may be used and provided to a user based on a measured display latency, such as by a letter scale, a number scale, a star scale, or any other suitable rating or score. In an embodiment, the grade may be displayed in combination with, or as an alternative to, the display latency measurement measured in seconds or milliseconds.

By providing a grade associated with a display latency measurement, a user may easily determine whether display 330 has a sufficiently low display latency so as not to hinder the user's experience. In addition, by providing the actual measured display latency in seconds or milliseconds and/or a grade associated with the measured display latency, a user may be enabled to compare the performance of his or her current display configuration with other users' display configurations, potentially influencing the user's decision to purchase a different display with a superior display latency or reconfigure the existing configuration to reduce the display latency.

Figure 9:
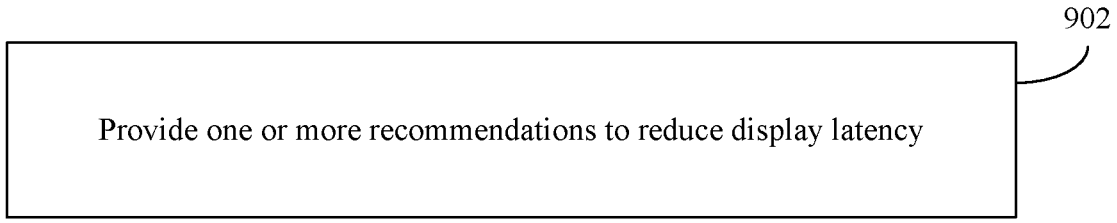
FIG. 9 shows a flowchart for providing a recommendation to reduce a display latency, according to an example embodiment.

In embodiments, video capturing device 140 and/or video capturing device 340 may also operate to provide a recommendation to a user regarding a measured display latency. For instance, FIG. 9 shows a flowchart 900 for displaying one or more recommendations to reduce a measured display latency, according to an example embodiment. Flowchart 900 is described with respect to video capturing device 140 and/or video capturing device 340 for illustrative purposes. Other structural and operational embodiments will be apparent to persons skilled in the relevant art(s) based on the following discussion regarding flowchart 900.

Flowchart 900 begins with step 902. In step 902, one or more recommendations to reduce a measured display latency is/are provided. In an embodiment, the one or more recommendations may include at least one suggestion to a user regarding a modification to the user's current configuration. In an embodiment, user interface 350 may be configured to recommend that a user modify one or more settings of display 330 to reduce the display latency. As illustrative examples, user interface 350 may recommend that a user modify a motion estimating setting, a color grading setting, an interpolation setting, a frame processing setting, a motion compensation setting, an automatic picture mode, and/or an automatic brightness/contrast setting of display 330. For instance, user interface 350 may recommend that a user manually select a "game mode" of display 330 to reduce the display latency. Note that the aforementioned list of recommendations to reduce the display latency of display 330 is not exhaustive. User interface 350 may recommend that a user modify any other setting, function, or process on display 330 that may affect the display latency of display 330.

In an embodiment, the one or more recommendations may include a recommendation to modify or optimize a coupling between display interface 316 and display 330. For instance, user interface 350 may provide a recommendation to reduce the display latency by coupling display 316 and display 330 without the use of any intermediate device, such as an audio/video receiver or a signal repeater. In another embodiment, a user may identify a brand and/or model of one or more of computing device 310, display 330, and/or any other device or cable coupled to computing device 310 and display 330. In this illustrative embodiment, user interface 350 may provide one or more specific recommendations to reduce the measured display latency based on the brand and/or model of the components identified by the user.

The one or more recommendations may be provided in a similar manner as described above with respect to providing a measured display latency. For instance, the one or more recommendations may be provided through user interface 350 of video capturing device 340, or may be provided on display 330 coupled to computing device 310.

Figure 10:
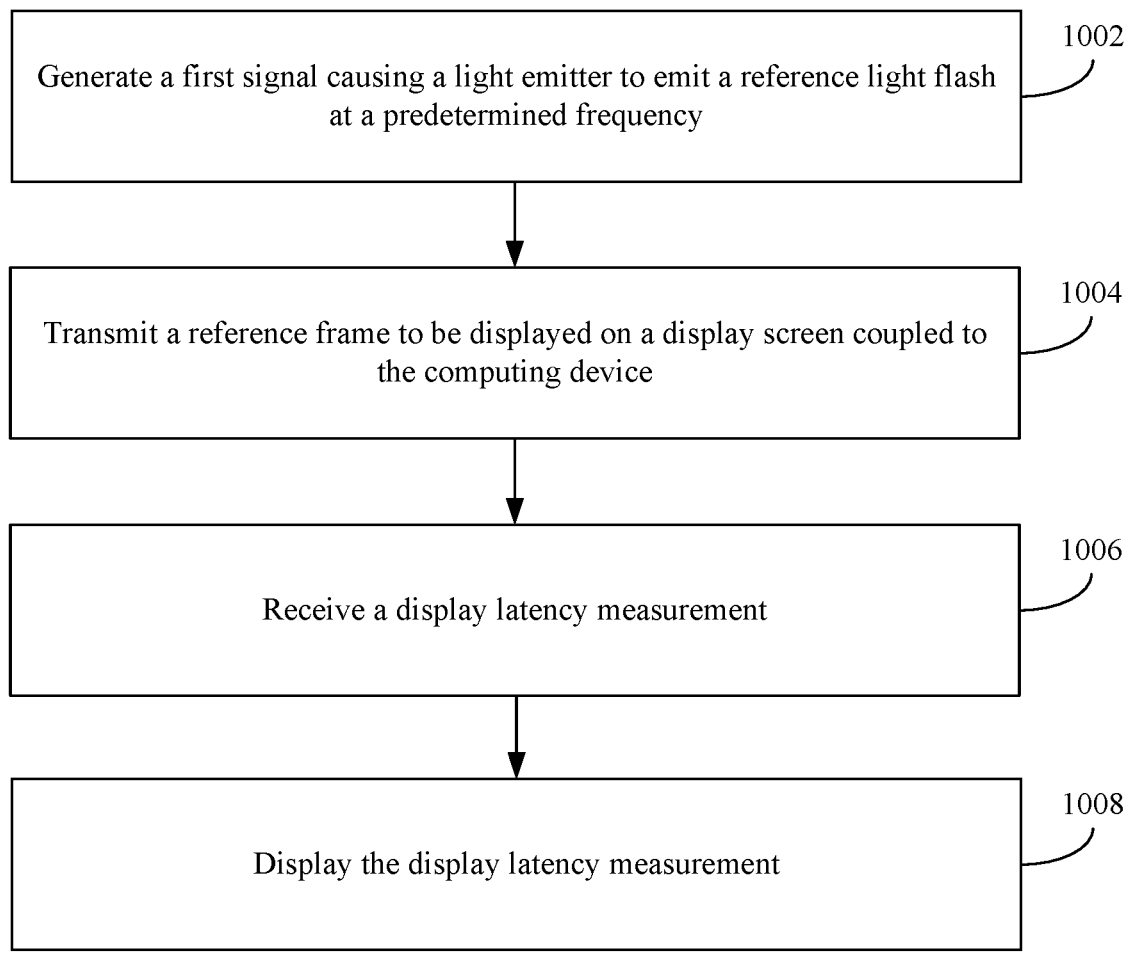
FIG. 10 shows a flowchart for enabling a display latency measurement, according to an example embodiment.

As described above, in an embodiment, computing device 110 and/or computing device 310 may operate in various ways to enable a display latency measurement. For instance, FIG. 10 shows a flowchart 1000 for enabling a display latency measurement using a reference light flash and a reference frame, according to an example embodiment. In one embodiment, flowchart 1000 may be implemented by computing device 110 and/or computing device 310, as shown in FIGS. 1 and 3. Other structural and operational embodiments will be apparent to persons skilled in the relevant art(s) based on the following discussion regarding flowchart 1000.

Flowchart 1000 begins with step 1002. In step 1002, a first signal is generated causing a light emitter to emit a reference light flash at a predetermined frequency. For instance, with reference to FIG. 3, reference light generator 318 may be configured to generate reference light signal 320 causing light emitter 314 to emit a reference light flash, in a similar manner as discussed above with reference to FIGS. 2 and 3. In an embodiment, reference light signal 320 causes light emitter 314 to emit a reference light flash at a predetermined frequency. For instance, light emitter 314 may emit a reference light flash at 1 hertz.

In step 1004, a reference frame to be displayed on a display screen coupled to the computing device is transmitted. With continued reference to FIG. 3, reference frame generator 322 of latency signal generator 312 transmits a reference frame signal 324 to display 330 via display interface 316, in a similar manner as described above. In an embodiment, latency signal generator 312 transmits reference light signal 320 and reference frame signal 324 at the same time, or substantially the same time, such that reference light signal 320 causes an emission of a reference light flash on light emitter 314 synchronized with a transmission of a reference frame to display 330 via display interface 316.

In step 1006, a display latency measurement is received. For instance, video capturing device 140 and/or video capturing device 340 may capture a video of a reference light flash on light emitter 314 and a flash of a predetermined image on a reference frame on display 330 and determine and transmit a corresponding display latency. In an embodiment, computing device 110 and/or computing device 310 may be configured to receive the determined display latency from video capturing device 140 and/or video capturing device 340. For instance, computing device 110 and/or computing device 310 may receive the measured display latency in any suitable manner, such as through a wired, wireless, and/or network coupling to video capturing device 140 and/or video capturing device 340.

In step 1008, the display latency measurement is displayed. With reference to FIG. 3, computing device 310 may transmit the received display latency measurement to display 330 via display interface 316, in a similar manner as described above. For instance, the measured display latency may include a time in milliseconds corresponding to the measured display latency, a grade associated with the measured display latency, and/or one or more recommendations to reduce the display latency of display 330, as described earlier.

III. Example Computer System Implementation

Computing device 110, latency signal generator 112, computing device 310, latency signal generator 312, reference light generator 318, reference frame generator 322, flowchart 200, flowchart 500, flowchart 600, flowchart 700, flowchart 800, flowchart 900, and/or flowchart 1000 may be implemented in hardware, or hardware combined with software and/or firmware. For example, latency signal generator 112, latency signal generator 312, reference light generator 318, reference frame generator 322, flowchart 200, flowchart 500, flowchart 600, flowchart 700, flowchart 800, flowchart 900, and/or flowchart 1000 may be implemented as computer program code/instructions configured to be executed in one or more processors and stored in a computer readable storage medium. Alternatively, latency signal generator 112, latency signal generator 312, reference light generator 318, reference frame generator 322, flowchart 200, flowchart 500, flowchart 600, flowchart 700, flowchart 800, flowchart 900, and/or flowchart 1000 may be implemented as hardware logic/electrical circuitry.

For instance, in an embodiment, one or more, in any combination, of latency signal generator 112, latency signal generator 312, reference light generator 318, reference frame generator 322, flowchart 200, flowchart 500, flowchart 600, flowchart 700, flowchart 800, flowchart 900, and/or flowchart 1000 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 11:
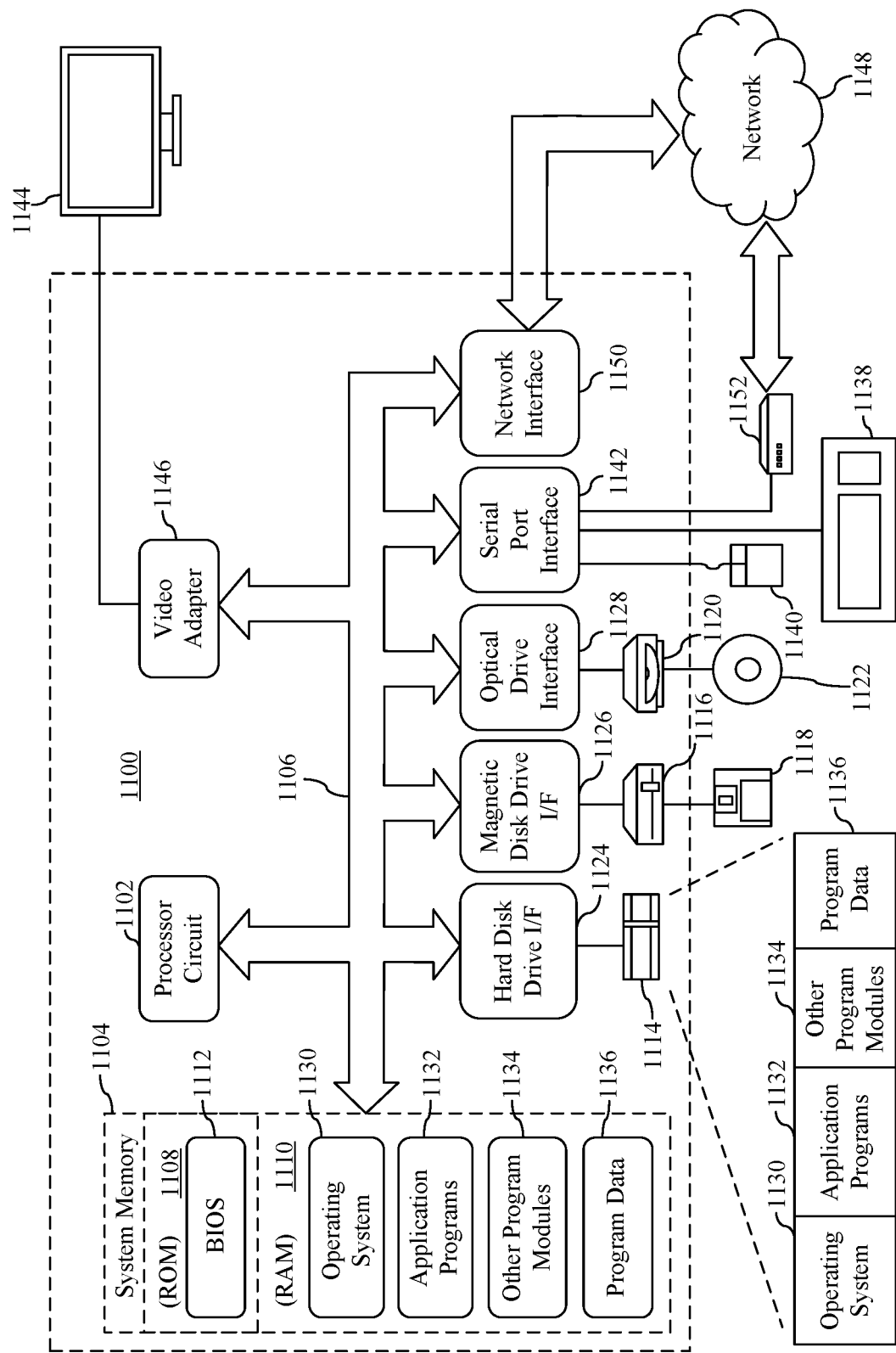
FIG. 11 is a block diagram of an example processor-based computer system that may be used to implement various embodiments.

FIG. 11 depicts an exemplary implementation of a computing device 1100 in which embodiments may be implemented. For example, computing device 110 and computing device 310 may each be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems, as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for latency signal generator 112, latency signal generator 312, reference light generator 318, reference frame generator 322, flowchart 200, flowchart 500, flowchart 600, flowchart 700, flowchart 800, flowchart 900, and/or flowchart 1000 (including any suitable step of flowcharts 200, 500, 600, 700, 800, 900, and 1000), and/or further embodiments described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers. Display screen 1144, and/or any other peripheral output devices (not shown) may be used for display 130, display 330, and/or any further embodiments described herein.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium" are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Mobile Device Implementation

Figure 12:
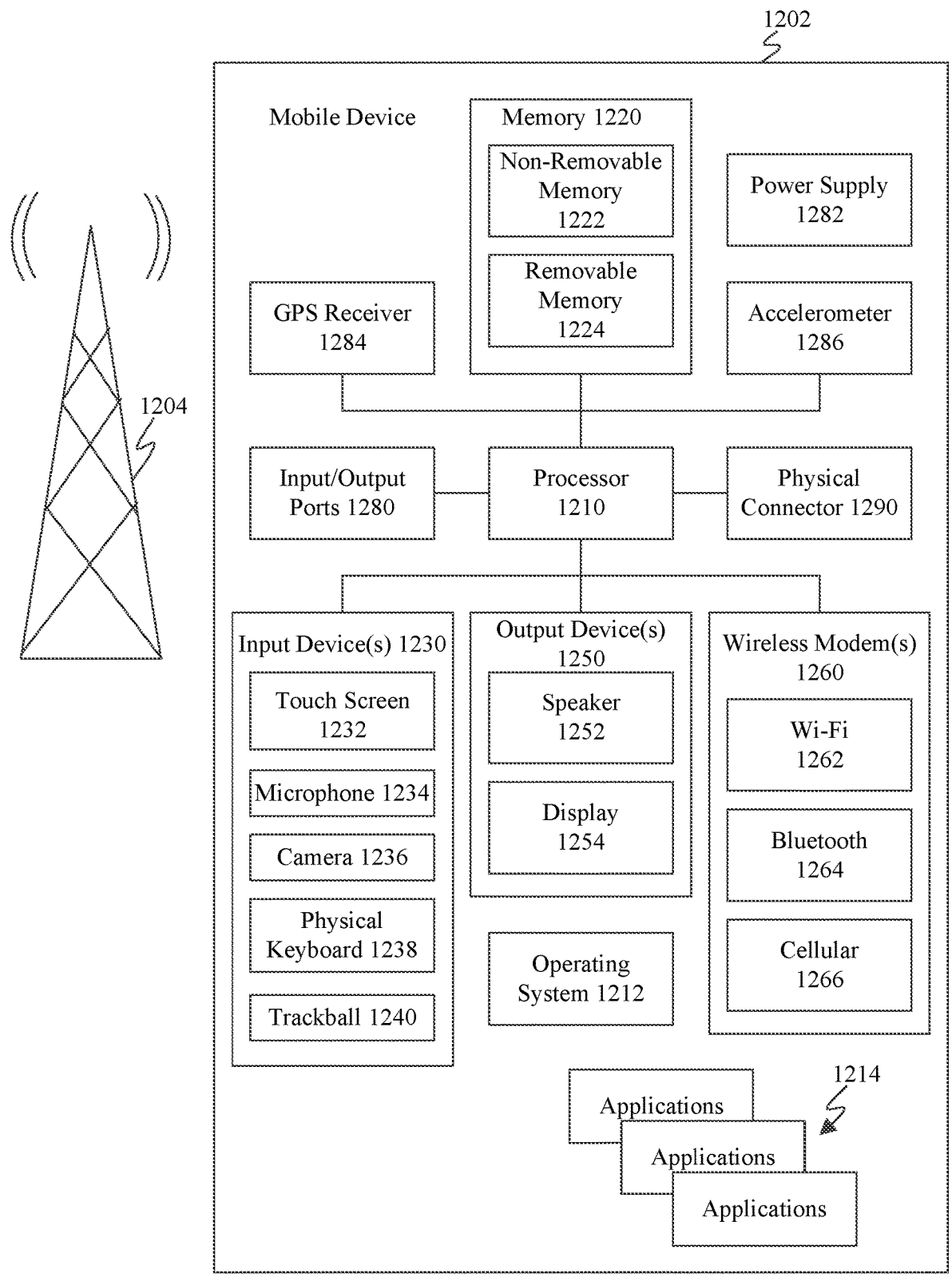
FIG. 12 is a block diagram of an example mobile device that may be used to implement various embodiments.

FIG. 12 is a block diagram of an exemplary mobile device 1202 that may implement embodiments described herein. For example, mobile device 1202 may be used to implement any of video capturing device 140 or latency measurement unit 144 described above in reference to FIG. 1, or video capturing device 340, latency measurement unit 344, video analyzer 346, latency determiner 348, or user interface 350 described above with reference to FIG. 3. As shown in FIG. 12, mobile device 1202 includes a variety of optional hardware and software components. Any component in mobile device 1202 can communicate with any other component, although not all connections are shown for ease of illustration. Mobile device 1202 can be any of a variety of computing devices (e.g., cell phone, smartphone, handheld computer, Personal Digital Assistant (PDA), etc.) and can allow wireless two-way communications with one or more mobile communications networks 1204, such as a cellular or satellite network, or with a local area or wide area network.

The illustrated mobile device 1202 can include a controller or processor 1210 (e.g., signal processor, microprocessor, ASIC, or other control and processing logic circuitry) for performing such tasks as signal coding, data processing, input/output processing, power control, and/or other functions. An operating system 1212 can control the allocation and usage of the components of mobile device 1202 and provide support for one or more application programs 1214 (also referred to as "applications" or "apps"). Application programs 1214 may include common mobile computing applications (e.g., digital personal assistants, e-mail applications, calendars, contact managers, web browsers, messaging applications) and any other computing applications (e.g., word processing applications, mapping applications, media player applications).

The illustrated mobile device 1202 can include memory 1220. Memory 1220 can include non-removable memory 1222 and/or removable memory 1224. Non-removable memory 1222 can include RAM, ROM, flash memory, a hard disk, or other well-known memory devices or technologies. Removable memory 1224 can include flash memory or a Subscriber Identity Module (SIM) card, which is well known in GSM communication systems, or other well-known memory devices or technologies, such as "smart cards." Memory 1220 can be used for storing data and/or code for running operating system 1212 and applications 1214. Example data can include web pages, text, images, sound files, video data, or other data to be sent to and/or received from one or more network servers or other devices via one or more wired or wireless networks. Memory 1220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile device 1202 can support one or more input devices 1230, such as a touch screen 1232, a microphone 1234, a camera 1236, a physical keyboard 1238 and/or a trackball 1240 and one or more output devices 1250, such as a speaker 1252 and a display 1254. Other possible output devices (not shown) can include piezoelectric or other haptic output devices. Some devices can serve more than one input/output function. For example, touch screen 1232 and display 1254 can be combined in a single input/output device. The input devices 1230 can include a Natural User Interface (NUI).

Wireless modem(s) 1260 can be coupled to antenna(s) (not shown) and can support two-way communications between the processor 1210 and external devices, as is well understood in the art. The modem(s) 1260 are shown generically and can include a cellular modem 1266 for communicating with the mobile communication network 1204 and/or other radio-based modems (e.g., Bluetooth 1264 and/or Wi-Fi 1262). At least one of the wireless modem(s) 1260 is typically configured for communication with one or more cellular networks, such as a GSM network for data and voice communications within a single cellular network, between cellular networks, or between the mobile device and a public switched telephone network (PSTN).

Mobile device 1202 can further include at least one input/output port 1280, a power supply 1282, a satellite navigation system receiver 1284, such as a Global Positioning System (GPS) receiver, an accelerometer 1286, and/or a physical connector 1290, which can be a USB port, IEEE 1394 (FireWire) port, and/or RS-232 port. The illustrated components of mobile device 1202 are not required or all-inclusive, as any components can be deleted and other components can be added as would be recognized by one skilled in the art.

In an embodiment, mobile device 1202 is configured to perform any of the functions of any of video capturing device 140 or latency measurement unit 144 described above in reference to FIG. 1, or video capturing device 340, latency measurement unit 344, video analyzer 346, latency determiner 348, or user interface 350 described above with reference to FIG. 3. Computer program logic for performing the functions of these devices may be stored in memory 1220 and executed by processor 1210. By executing such computer program logic, processor 1210 may be caused to implement any of the features of any of these devices. Also, by executing such computer program logic, processor 1210 may be caused to perform any or all of the steps of flowchart 200, flowchart 500, flowchart 600, flowchart 700, flowchart 800, flowchart 900, and/or flowchart 1000.

V. Additional Example Embodiments

A system for measuring a display latency is disclosed herein. The system includes: a video capturing device configured to capture a video of a reference light flash of a light emitter of a computing device and, in the same video, a predetermined image displayed in a reference frame on a display screen coupled to the computing device, the reference frame transmitted from the computing device for display in the display screen; a video analyzer configured to analyze the video to determine a time difference between the reference light flash and the display of the predetermined image; a latency determiner configured to compare the determined time difference with a reference time difference to determine a display latency; and an output device configured to provide the display latency.

In one embodiment of the foregoing system, the video capturing device is a smartphone.

In another embodiment of the foregoing system, the output device is the display screen coupled to the computing device.

In another embodiment of the foregoing system, the output device is a display screen of a smartphone.

In another embodiment of the foregoing system, the output device is further configured to provide a grade associated with the display latency.

In another embodiment of the foregoing system, the output device is further configured to provide at least one recommendation to reduce the display latency In another embodiment of the foregoing system, the predetermined image displayed in the reference frame is a near pattern.

In another embodiment of the foregoing system, the video capturing device is further configured to capture a plurality of reference light flashes and a plurality of displays of the predetermined image.

In another embodiment of the foregoing system, the capturing device is further configured to capture the video of the reference light flash prior to capturing the predetermined image displayed in the reference frame.

A method of measuring a display latency is described herein. The method includes: capturing a video of a reference light flash of a light emitter of a computing device; capturing, in the same video, a predetermined image displayed in a reference frame on a display screen coupled to the computing device, the reference frame transmitted from the computing device for display in the display screen; analyzing the video to determine a time difference between the reference light flash and the display of the predetermined image; comparing the determined time difference with a reference time difference to determine a display latency; and providing the display latency.

In one embodiment of the foregoing method, the capturing a video of a reference light flash of a light emitter of a computing device comprises: capturing the video of the reference light flash with a camera of a smartphone.

In another embodiment of the foregoing method, the providing the display latency comprises: displaying the display latency on the display coupled to the computing device.

In another embodiment of the foregoing method, the providing the display latency comprises: displaying the display latency on a smartphone.

In another embodiment of the foregoing method, the method further comprises: providing a grade associated with the display latency.

In another embodiment of the foregoing method, the method further comprises: providing at least one recommendation to reduce the display latency.

In another embodiment of the foregoing method, the predetermined image displayed in the reference frame is near a pattern.

In another embodiment of the foregoing method, the capturing a video of a reference light flash of a light emitter of a computing device comprises: capturing a plurality of reference light flashes; and the capturing, in the same video, a predetermined image displayed in a reference frame on a display screen coupled to the computing device comprises: capturing a plurality of flashes of the predetermined image.

In another embodiment of the foregoing method, the capturing a video of a reference light flash of a light emitter of a computing device comprises: capturing the video of the reference light flash prior to said capturing, in the same video, the predetermined image displayed in the reference frame.

A computer-readable storage medium having program instructions recorded thereon that, when executed by at least one processing circuit, perform a method on a computing device for enabling a display latency measurement. The method includes: generating a first signal causing a light emitter to emit a reference light flash on a computing device at a predetermined frequency; transmitting a reference frame containing a predetermined image to be displayed on a display screen coupled to the computing device at the predetermined frequency; receiving a display latency measurement; and displaying the display latency measurement.

In one embodiment of the foregoing computer-readable storage medium, the method further comprises: displaying at least one of a grade associated with the display latency, or at least one recommendation to reduce the display latency.

VI. Conclusion

While various example embodiments have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A mobile device, comprising:
   a first display screen;
   a camera;
   a processor; and
   a computer readable storage medium storing computer program instructions which, when executed by the processor, cause the processor to:
   using the camera, capture video including at least:
     a reference light flash of a light emitter of a gaming console, and
     a predetermined image displayed in a reference frame on a second display screen coupled to the gaming console via a video interface, the reference frame transmitted from the gaming console for display on the second display screen;
   analyze the video to determine a time difference between the reference light flash and the display of the predetermined image;
   compare the determined time difference with a reference time difference to determine a display latency measurement;
   identify a setting modification for the second display screen to reduce latency; and
   output the setting modification on the first display screen of the mobile device.

2. The mobile device of claim 1, embodied as a smartphone.

3. The mobile device of claim 2, wherein the setting modification suggests changing the second display screen to a game mode.

4. The mobile device of claim 2, wherein the first display screen of the mobile device is a touch screen.

5. The mobile device of claim 1, wherein the computer program instructions, when executed by the processor, cause the processor to:
   output a grade associated with the display latency measurement on the first display screen.

6. The mobile device of claim 1, wherein the computer program instructions, when executed by the processor, cause the processor to:
   output at least one recommendation to reduce the display latency measurement by coupling the gaming console to the second display screen directly without the use of an intermediary receiver or intermediary signal repeater.

7. The mobile device of claim 1, wherein the computer program instructions, when executed by the processor, cause the processor to:
   determine a brand of the second display screen; and
   determine the setting modification to reduce the latency based at least on the brand of the second display screen.

8. The mobile device of claim 1, wherein the computer program instructions, when executed by the processor, cause the processor to:
   determine a model of the second display screen; and
   determine the setting modification to reduce the latency based at least on the model of the second display screen.

9. The mobile device of claim 1, wherein the computer program instructions, when executed by the processor, cause the processor to:
- determine a brand or model of the gaming console; and
- determine the setting modification to reduce the latency based at least on the brand or model of the gaming console.

10. A method, comprising:
- by a mobile device having a first display screen, capturing a video of a reference light flash of a light emitter of a gaming console;
- by the mobile device, capturing, in the same video, a predetermined image displayed in a reference frame on a second display screen coupled to the gaming console via a video interface, the reference frame transmitted from the gaming console for display by the second display screen;
- analyzing the video to determine a time difference between the reference light flash and the display of the predetermined image on the second display screen;
- comparing the determined time difference with a reference time difference to determine a display latency measurement;
- identifying a setting modification for the second display screen to reduce latency; and
- outputting the identified setting modification on the first display screen of the mobile device.

11. The method of claim 10, wherein the identified setting modification controls motion estimation by the second display screen.

12. The method of claim 11, wherein the identified setting modification controls color grading by the second display screen.

13. The method of claim 10, wherein the identified setting modification includes suggested modifications to at least one of the following:
- a frame processing setting of the second display screen,
- an automatic picture mode setting of the second display screen, or
- an automatic brightness/contrast setting of the second display screen.

14. The method of claim 10, further comprising:
- displaying, on the first display screen of the mobile device, a grade associated with the display latency measurement.

15. The method of claim 10, further comprising:
- displaying, on the first display screen of the mobile device, at least one recommended hardware change to reduce the display latency measurement.

16. The method of claim 10, wherein the predetermined image displayed in the reference frame is near a pattern.

17. The method of claim 10, performed multiple times by capturing a plurality of reference light flashes and a plurality of reference frames having the predetermined image.

18. The method of claim 10, wherein the reference light flash is captured prior to the reference frame having the predetermined image.

19. A computer-readable storage device having program instructions recorded thereon that, when executed by at least one processing circuit, cause the at least one processing circuit to perform acts comprising:
- accessing a video of a reference light flash of a light emitter of a gaming console;
- identifying, in the video, a predetermined image displayed in a reference frame on a display screen coupled to the gaming console via a video interface, the reference frame transmitted from the gaming console for display by the display screen;
- analyzing the video to determine a time difference between the reference light flash and the display of the predetermined image;
- comparing the determined time difference with a reference time difference to determine a display latency measurement;
- identifying a setting modification for the display screen to reduce subsequent display latency measurements by coupling the gaming console to the display screen directly without the use of an intermediary receiver or intermediary signal repeater; and
- outputting the identified setting modification.

20. The method of claim 10, wherein the identified setting modification controls motion compensation by the second display screen.

21. The method of claim 10, wherein the identified setting modification controls interpolation by the second display screen.

* * * * *